C. W. SOULE & G. F. DAYMON.
CAR-COUPLING.
No. 182,292. Patented Sept. 19, 1876.
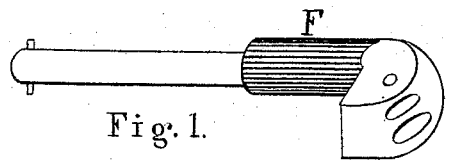
Fig. 1.
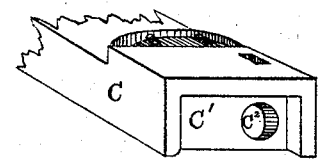
Fig. 2.
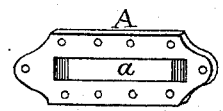
Fig. 3.
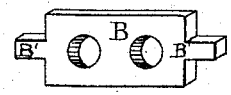
Fig. 4.
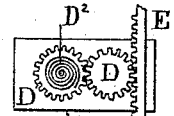
Fig. 5.
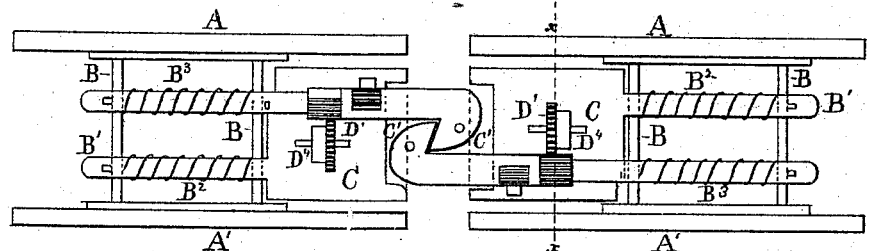
Fig. 6.
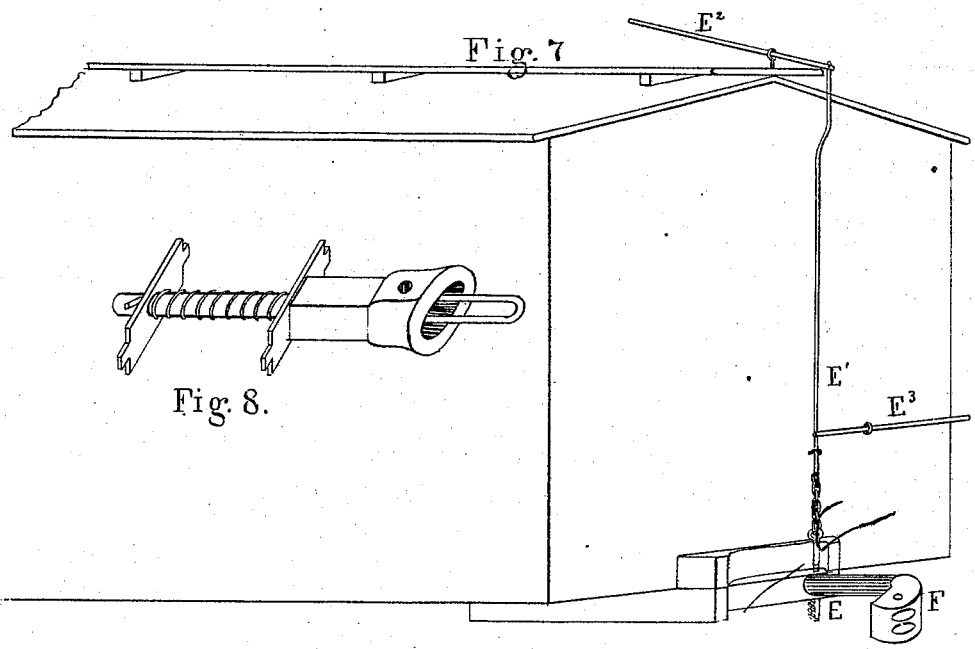
Fig. 7.
Fig. 8.
Attest
C. M. Cornell
Alfred Cloughly
Inventors
Charles W. Soule
Galen F. Daymon
Per Blanchard & Singleton
Attorneys.

UNITED STATES PATENT OFFICE.

CHARLES W. SOULE AND GALEN F. DAYMON, OF WEYMOUTH, MASS.

IMPROVEMENT IN CAR-COUPLINGS.

Specification forming part of Letters Patent No. 182,292, dated September 19, 1876; application filed March 9, 1876.

*To all whom it may concern:*

Be it known that we, CHARLES W. SOULE and GALEN F. DAYMON, of Weymouth, in the county of Norfolk and State of Massachusetts, have invented certain new and useful Improvements in Car Couplings and Buffers; and we do hereby declare that the following is a full, clear, and exact description thereof, which will enable others skilled in the art to which it pertains to make and use the same, reference being had to the accompanying drawings, and to the letters of reference marked thereon, which form a part of this specification—

Figure 1 being a perspective view of our improved coupling-hook, which is adapted to receive an ordinary link when being coupled to a buffer of usual construction, and also so as to be partially rotated when being coupled to or uncoupled from a car having upon it hooks of similar construction. Fig. 2 is a perspective view of the buffer, which is perforated to receive the rounded or otherwise-formed portion of the coupling-hook, which is surrounded by a spring, its outer end being recessed to receive the head of the coupling-hook, and thus prevent it from turning when in use. Fig. 3 is an elevation of one of the side pieces of the frame which carries the buffer-springs, and regulates the longitudinal movement thereof. Fig. 4 is an elevation of one of the cross-bars, through which the shank of the coupling-hook passes, and another rod for supporting an auxiliary buffing-spring. Fig. 5 is a transverse section on line $x\ x$ of Fig. 6, showing the mechanism for partially rotating the coupling-hooks, and the spring for returning them to their normal positions. Fig. 6 is a plan view of two of our improved buffers as they appear in use, showing the parts in position, and the box or frame in which they work. Fig. 7 is a perspective view of a portion of a car, showing one of our hooks attached, and the arrangement of levers for operating the same. Fig. 8 is a perspective view of an ordinary buffer having an aperture in its end for the reception of a coupling-link, which is shown in position.

Corresponding letters denote like parts in the several figures.

This invention relates to devices for coupling cars, and for relieving the shocks caused by bringing them forcibly together, and by the sudden starting thereof; and it consists in providing for such purposes a partially-revolving coupling-hook, and in the construction, combination, and arrangement of some of the parts of which it is composed, as will be more fully described hereinafter.

In constructing our improved apparatus, and in applying it to cars, we attach to the under side of a car-body, or to suitable timbers attached thereto, plates of metal A A', or they may be of wood, said bars being slotted as shown at $a$, Fig. 3, for the reception of tenons or projections $B^1$, formed upon plates B, said plates acting in conjunction with slotted plates A A', and serving to control the longitudinal movements of the coupling-hooks and of the buffer. The plates B B are perforated, as shown in Figs. 4 and 6, one of said perforations being in the line of the axis of the coupling-hook, and the other at about the same distance from the opposite end of the plate, the latter being for the reception of a rod which supports an auxiliary spring, $B^2$, carried upon the buffer. Connected with the shank of the coupling-hooks is a spring, $B^3$, which allows them to recede slightly when coming into contact, before their outer ends come in contact with the buffers proper, at which time the two springs $B^2$ and $B^3$ act in conjunction as buffer-springs.

The buffer above alluded to consists of a block or box of metal, C, having in its outer end a recess, $C^1$, which is of such depth as to let the outer ends of the coupling-hooks enter them, as shown in Fig. 6, to such a distance as to allow said hooks to be turned into their coupled position, as there shown. Owing to the fact that the upper and side walls of the recess above named extends beyond the inner portion thereof, and to there being no corresponding wall upon the lower portion thereof, the coupling-hooks can be turned downward, so as to allow them to be coupled or uncoupled, but are prevented from being turned upward, and thus uncoupled when the cars are in motion.

The buffer C has formed in it an aperture, $C^2$, which extends throughout its entire length, a portion thereof being of the proper diameter to receive the shank or reduced portion of the coupling-hook, and the remainder of sufficient size to receive the larger toothed portion thereof. It is also recessed near its central portion, so as to cause it to receive the cogged wheels D and $D^1$, the latter of which meshes with teeth formed upon the enlarged portion of the coupling-hook, as will be fully shown hereafter.

The wheels D and $D^1$ are supported upon shafts which have their bearings in the buffer C, the last-named one carrying upon its shaft a coiled spring, $D^2$, arranged in a drum or case, $D^4$, which is also within the buffer.

Near one side of the buffer, and in such a position as to be outside of the end of the car when the buffer has receded to its full extent, there is formed a notch or recess for the passage of cogged rack E, which meshes with the wheel D, and thus imparts motion thereto, and through it to the wheel $D^1$ and to the coupling-hook.

For enabling the operator to impart the required movements to the rack E without passing between the cars, and thus endangering his life or limbs, a rod, $E^1$, is attached to the upper end thereof, by means of a chain or other flexible device, said rod extending up to the top of the car, and being there connected to a lever, $E^2$, so that the rack may be moved, and the cars coupled or uncoupled from that point.

It is important that provision should be made for manipulating the coupling-hooks by a person who may be standing upon the ground; and for this purpose we apply a lever, $E^3$, to the end of the car in such a position as to be within reach of the operator, it being pivoted so as to cause its long arm to extend outward, so that it can be operated without stepping between the cars, and so that its inner end may be connected to the rod $E^1$, or to the chain attached to the rack.

One of the important features of our invention consists of the partially-rotating coupling-hook F, the form of which is shown in Fig. 1, it consisting of a bar of metal having upon its outer end a strong hook, the inner surface of which is undercut or beveled, as shown, to prevent it from becoming detached from its fellow by lateral movement, when in use. The outer portion of this hook is provided with two or more apertures, one above the other, which are adapted for the reception of an ordinary coupling-link, by which it can be connected to an ordinary buffer, such as is shown in Fig. 8 of the drawing. It also has formed in it a hole for the passage of a pin for retaining the link in position when used as above described. In order that this hook may be adapted for use in connection with another of the same construction, and upon another car, that portion thereof which is immediately in rear of the hooked portion is furnished with cogs upon its periphery, which receive the teeth of the wheel $D^1$, as above described, it being so arranged with reference thereto that when the two hooks of adjacent cars are in the positions shown in Fig. 6 of the drawing, either hook may be turned downward, and thus disengaged from the opposite one, and the cars uncoupled, when, by the action of the spring $D^2$, which is so arranged as to give a partially-rotative movement to the hook, it will be returned to its normal position, unless held in its downward or uncoupled position by the operator, or by fixing the levers $E^2$ or $E^3$ in such a position as to hold it downward until it is desirable to have it connect with the car with which it may come in contact, which will often be the case when switching cars or in making up trains. That portion of this hook which passes through the buffer-head and through the plates B is to be of such diameter as not to cause too much friction thereon; otherwise it will be prevented from turning freely when it is required to couple with another.

Should it be found desirable to provide the buffer with additional resisting power, springs may be placed between the upper portion of the buffer and the ends of the car, on a line with the sills thereof.

Having thus described our invention, what we claim, and desire to secure by Letters Patent, is—

1. The partially-revolving coupling-hook F, provided with teeth or projections for giving to it the required rotative movement, it being arranged to operate substantially as and for the purpose set forth.

2. The combination of the partially-rotating coupling-hook F and the buffer C, having a recess in its outer end, as described, the parts being arranged to operate substantially as set forth.

3. The combination of the partially-rotating coupling-hook, the buffer C, the plates B B, the rod $B^1$, and the springs $B^2$ and $B^3$, substantially as shown and described.

4. The combination of a partially-revolving coupling-hook, gear-wheels for operating the same, and a toothed rack operated by a lever or levers, substantially as and for the purpose set forth.

5. The combination of a partially-rotating coupling-hook, a spring for operating the same, and a gear-wheel for imparting motion thereto, they being arranged to operate substantially as set forth.

In testimony that we claim the foregoing as our own invention we affix our signatures in presence of two witnesses.

CHARLES W. SOULE.
GALEN F. DAYMON.

Witnesses:
ALVAH RAYMOND,
BENJAMIN G. RAYMOND.